United States Patent Office 3,795,669
Patented Mar. 5, 1974

3,795,669
DERIVATIVES OF SPIRAMYCIN AND A PROCESS FOR PRODUCING THEREOF
Yasuo Fujimoto, Yokohama, and Kinichi Nakano, Tokyo, Japan, assignors to Rhone-Poulenc S.A., Paris, France
Filed July 9, 1971, Ser. No. 161,195
Claims priority, application Japan, July 9, 1970, 45/59,484
Int. Cl. C07c 47/18
U.S. Cl. 260—210 AB     1 Claim

ABSTRACT OF THE DISCLOSURE

The present invention relates to novel derivatives of spiramycin which are useful as medicants for animal and plant diseases, as well as starting materials for the production of such medicants. More particularly, it relates to novel hydrazones of spiramycin and salts thereof.

Novel hydrazones of spiramycin of the present invention are the following and esters and acid addition salts thereof:

Spiramycin dimethylhydrazone
Spiramycin N,N-dinormalamylhydrazone
Spiramycin N,N-diisopropylhydrazone
Spiramycin N,N-diallylhydrazone
Spiramycin N-$\beta$-hydroxyethyl-N-methylhydrazone
Acetylspiramycin dimethylhydrazone
Spiramycin 1-amino-4-methylperazinehydrazone
Spiramycin N-phenyl-N-methylhydrazone
Spiramycin N-cyclohexyl-N-methylhydrazone
Acetylspiramycin N-aminopiperidinehydrazone
Spiramycin N-aminomorpholine hydrazone

BACKGROUND OF THE INVENTION

There are three types of spiramycin which are known as spiramycin I, spiramycin II, and spiramycin III. In the present specification, the term "spiramycin" is used in its broader sense to include not only above-named three types of spiramycin but also ester type derivatives thereof, such as mono- and di-acetyl spiramycins.

Spiramycin is a macrolide antibiotic of known type which is useful as medicament for diseases of human, animal, plant, etc. as well as a starting material for the production of such medicaments. However, spiramycin, in its narrow meaning, i.e., spiramycin I, spiramycin II and spiramycin III, has disadvantages, such as poor solubility in water and a relative low stability in use as the starting material.

Some hydrazones of spiramycin, for example, spiramycin hydrazone and spiramycin phenylhydrazone have been reported in the art.

Several novel types of hydrazones of spiramycin have now been discovered. These novel hydrazones of spiramycin can be obtained by modifying the aldehyde group of the macrolide ring of spiramycin. The stability of the thus-obtained novel hydrazones is superior to that of spiramycins I, II and III. Furthermore, if desired, it is also possible to obtain acid salts of these hydrazones by using a suitable organic or inorganic acid. These acid salts are readily dissolved in water.

It has also been shown that physical and chemical properties of these hydrazones and salts thereof are quite similar to those of spiramycins I, II and III so that they can be used as superior substitutes for spiramycin with additional advantageous results. Still further, hydrazones of spiramycin show remarkable effects in protection tests.

An object of the present invention is to provide novel hydrazones of spiramycin.

Another object of the present invention is to provide a process for producing novel hydrazones of spiramycin.

Other objects and features of the present invention will be apparent from the following specification.

SUMMARY OF INVENTION

According to the present invention, novel hydrazones of spiramycin and a process for producing the said hydrazones are taught. Said process is characterized by subjecting spiramycin or the acid salt thereof to reaction with a hydrazine selected from the group consisting of dimethylhydrazine, N,N-dinormalamylhydrazine, N,N-diisopropylhydrazine, N,N-diallylhydrazine, N-$\beta$-hydroxyethyl-N-methylhydrazine, 1-amino-4-methylpiperazine, N-phenyl-N-methylhydrazine, N-cyclohexyl-N-methylhydrazine, N-aminopiperidine and N-aminomolphorine, or the salt thereof in a solvent capable of dissolving the said reaction materials.

Solvents which may be used for the purpose of the present invention are exemplified by the following, although other solvents which are capable of dissolving spiramycin or the salt thereof, and the hydrazine or the salt thereof, without deleterious influence may also be used.

(a) aliphatic and alicyclic alcohols having 1 to 10 carbon atoms, such as methanol, ethanol, propanol and its isomers, butanol and its isomers, hexanol, pentanol and its isomers, cyclohexanol, octanol and its isomers, etc.
(b) aromatic alcohols such as benzyl alcohol,
(c) mixture of (a) and (b), and
(d) water in the case when an acid salt of spiramycin is used. Alternatively, water together with sufficient acid equivalent to the amount of spiramycin to be used may be employed.

The reaction temperature is below the boiling point of the solvent used and above 0° C. (preferably from ambient to 100° C.). The reaction time may vary, depending upon various conditions such as the reaction temperature, the types of the used hydrazine, etc. The reaction is usually completed within 4 hours at 50° C., or equivalent conditions.

As described in the following, in case an acid is present in the solvent, or an acid salt of the hydrazine, or alternatively, an acid salt of spiramycin is used for the production of salts of hydrazones, the reaction is completed within a shorter period of time even when carried out at an ambient temperature.

The reaction can be carried out in water or organic solvent. For producing hydrazones, it is preferable to dissolve spiramycin or a salt thereof in the solvent. The hydrazine or its acid salt is then added. The amount of the hydrazine used is preferably an equivalent amount to spiramycin. It is more favorable to use a slightly excessive amount of hydrazine to obtain a better yield.

According to another aspect of the present invention it is also possible to introduce an organic acid or mineral acid into the reaction system to obtain an acid salt of hydrazone of spiramycin.

Organic acids which may be used for the purpose of the present invention include organic acids having 1 to 10 carbon atoms, exemplified by formic acid, acetic acid, propionic acid, butyric acid, valeric acid, oxalic acid, citric acid, malonic acid, succinic acid, fumaric acid, maleic acid and its isomers, etc.

It is also possible to use a various mineral acids, such as e.g., hydrochloric acid, sulfuric acid, phosphoric acid, hydrobromic acid, hydroiodic acid, nitric acid, etc. These acids can be added to the organic solvent, while it is also possible to use an acid salt of the hydrazine or an acid salt of spiramycin for substitution of the acid and hydrazine or spiramycin.

The hydrazine and acid can be added to the solvent separately or simultaneously. Alternatively, it is also possible to solely use an acid salt of the hydrazine rather than the hydrazine and acid. It is further possible to add an acid to hydrazone which has already been produced to convert it into an acid salt thereof.

The following Table I exemplifies the results of antibiotic activity tests of spiramycin derivatives on several microorganisms carried out in test tubes (designated by minimum growth inhibition concentration).

TABLE 1

| Starting antibiotic | Reagent | Minimum growth inhibition concentration (γ/ml.) | |
|---|---|---|---|
| | | *Streptococcus faecalis* STCC 10541 | *Staphylococcus aureus* ATCC 6538 P |
| Spiramycin | | 3.125 | 3.125 |
| Acetylspiramycin | | 12.5 | 12.5 |
| Spiramycin | $NH_2NHCH_2CH_2OH$ | 6.25 | 6.25 |
| Do | $NH_2N(CH_3)_2$ | 3.125 | 6.25 |
| Do | $(CH_3)_2NNH_2 \cdot HCl$ | 12.5 | 12.5 |
| Do | $CH_3N(\text{piperazine})NNH_2$ | 1.563 | 1.563 |
| Do | $(n-C_5H_{11})_2NNH_2$ | 1.563 | 0.782 |
| Do | $(iso\ C_3H_7)_2NNH_2$ | 1.563 | 1.563 |
| Do | $(CH_2=CHCH_2)_2NNH_2$ | 3.125 | 1.563 |
| Do | $OHCH_2CH_2N(CH_3)NNH_2$ | 1.563 | 1.563 |
| Do | $C_6H_5N(CH_3)NNH_2$ | 1.563 | 1.563 |
| Do | cyclohexyl-$N(CH_3)NNH_2$ | 6.25 | 1.563 |
| Do | morpholine-$NNH_2$ | 0.782 | 0.782 |
| Acetylspiramycin | $NH_2N(CH_3)_2$ | 12.5 | 12.5 |
| Do | piperidine-$NNH_2$ | 1.563 | 1.563 |

The infection in mice of spiramycin dimethylhydrazone obtained by the present invention by using pneumonial diplococcus as indicated by $ED_{50}$ is as follows:

Spiramycin dimethylhydrazone: $ED_{50}=80$ mg./kg.
Spiramycin: $ED_{50}=125$ mg./kg.

The following non-limitative examples further illustrate the invention.

Example 1.—Synthesis of spiramycin dimethylhydrazone

Spiramycin crystal (4 g.) was dissolved in ethyl alcohol (100 ml.). To the solution was added an equimolar amount (about 0.3 g.) of 1,1-dimethylhydrazine. The combined mixture was boiled under reflux for 4 hours. Ethyl alcohol was distilled out from the mixture under reduced pressure. After this, the remainder was crystallized by using ethyl ether to obtain white, needle-like crystals (about 3 g.). Further, crystals (about 1 g.) were obtained from the mother liquor. M.P.: 202–203° C.

Figure 1:
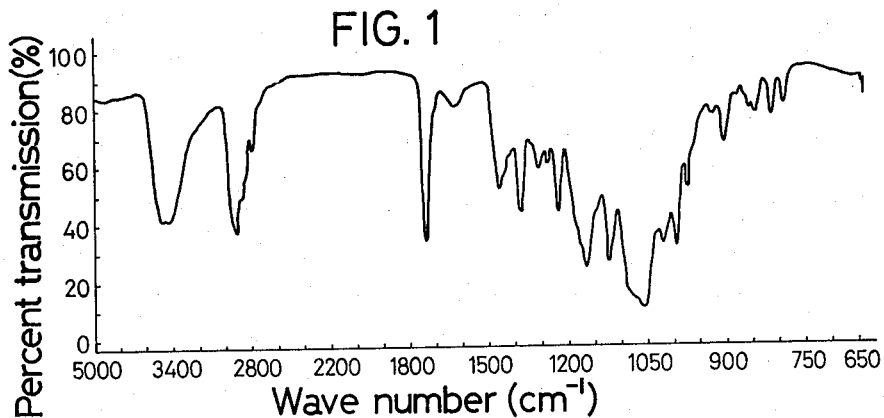
FIG. 1 shows an infrared absorption spectrum of spiramycin dimethylhydrazone by using the KBr tablet method.
Figure 13:
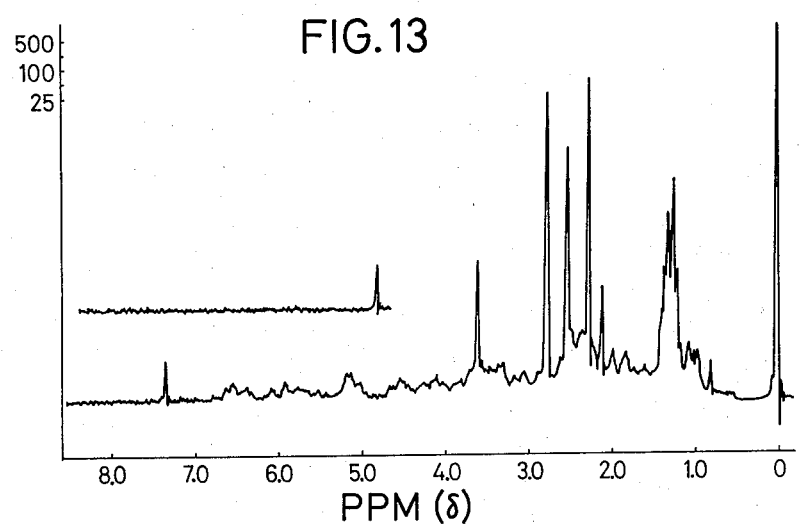
FIG. 13 shows a 60 mHz. nuclear magnetic resonance spectrum of spiramycin dimethylhydrazone in $CDCl_3$.

By observing the facts that the signal of aldehyde disappeared and that a new signal due to the dimethyl group of dimethylhydrozone appeared at 2.78 p.p.m. in the nuclear magnetic resonance spectrum in $CDCl_3$, it was confirmed that this product was spiramycin dimethylhydrazone. Infrared absorption spectrum of the product by using the KBr tablet method is shown in FIG. 1. Nuclear magnetic resonance spectrum (60 mHz.) of the product by using $CDCl_3$ is shown in FIG. 13.

Example 2

Spiramycin (mixture of I, II and III) (4 g.) was subjected to a reaction carried out in a similar manner to that described in Example 1. After this, ethyl alcohol was distilled out from the reaction mixture under reduced pressure to obtain a white powder. Nuclear magnetic resonance spectrum and infrared absorption spectrum of this product were quite similar to those described in Example 1, from which it was confirmed that the product is spiramycin dimethylhydrazone. Yield: 4 g.

Example 3

A similar reaction to that described in Example 2 was carried out except that ethyl alcohol was replaced by methyl alcohol, i-propyl alcohol or cyclohexanol to give spiramycin dimethylhydrazone having similar melting point and infrared absorption spectrum to those described in Example 1. Yield: 4 g.

Example 4

A similar reaction to that described in Example 2 was carried out except that ethyl alcohol was replaced by n-butyl alcohol, n-hexanol or 2-ethylhexanol to give spiramycin dimethylhydrazone having similar melting point and infrared absorption spectrum to those described in Example 1. Yield: 4 g.

Example 5.—Synthesis of spiramycin dimethylhydrazone monohydrochloride

Figure 2:
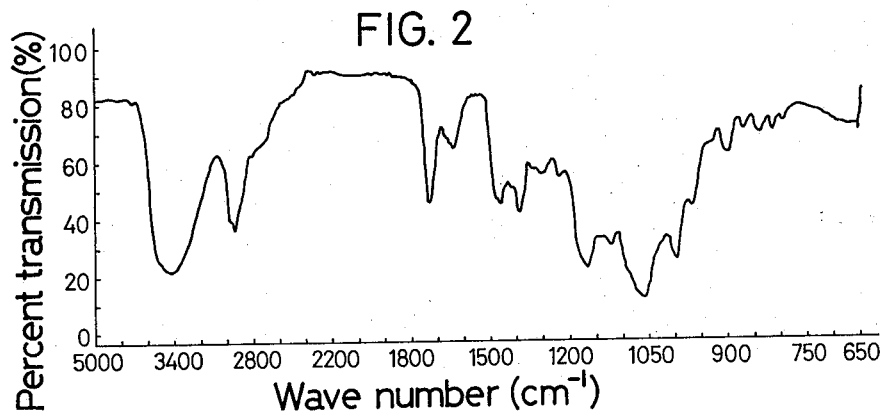
FIG. 2 shows an infrared absorption spectrum of spiramycin dimethylhydrazone monohydrochloride by using the KBr tablet method.

Spiramycin (4 g.) was dissolved in ethyl alcohol (100 ml.) An equimolar amount of 1,1-dimethylhydrazine hydrochloride was added to the solution. After ten minutes, ethyl alcohol was distilled out from the combined mixture under reduced pressure to obtain a water-soluble white powder. In view of the observation that the signal of aldehyde disappeared and a new signal due to the dimethyl group of dimethylhydrazone appeared at 2.68 p.p.m. in nuclear magnetic resonance spectrum in tetradeuteromethanol, it was confirmed that this product is spiramycin dimethylhydrazone mono-hydrochloride. Infrared absorption spectrum of the product by using KBr tablet method is shown in FIG. 2. Yield: 4 g. M.P.: 159–162° C.

Example 6

Spiramycin dimethylhydrazone obtained in a similar manner to that described in Example 2 was dissolved in methyl alcohol. An equimolar amount of hydrochloric acid was added to the solution. After this, methyl alcohol was distilled out from the mixture under reduced pressure to obtain a white powder having similar physical and chemical properties to those described in Example 5. Yield: 4 g.

Example 7.—Synthesis of spiramycin-N,N-dinormalamylhydrazone

Figure 3:
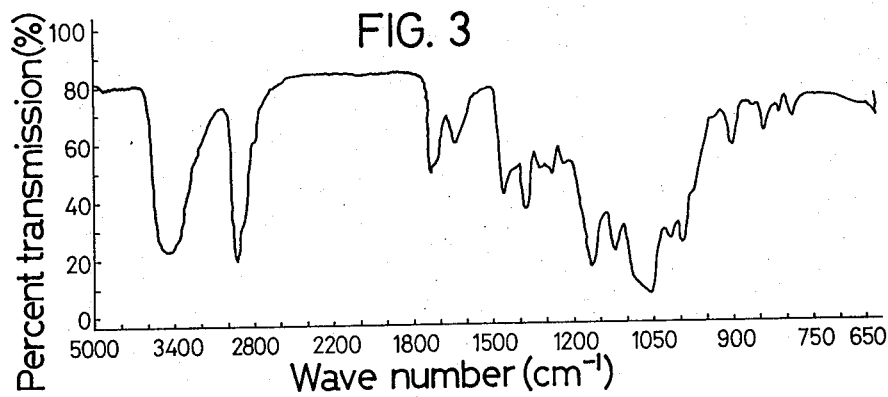
FIG. 3 shows an infrared absorption spectrum of spramycin-N,N-dinormalamylhydrazone by using the KBr tablet method.

Spiramycin (4 g.) was dissolved in ethyl alcohol (100 ml.) and to the solution was added an equimolar amount of N,N-normaldiamylhydrazine. A reaction was carried out in a similar manner to that described in Example 2 to give a white powder. Infrared absorption spectrum of this product by using the KBr tablet method is shown in FIG. 3. Yield: 4 g. M.P.: 98–105° C.

Example 8.—Synthesis of spiramycin-N,N-diisopropylhydrazone

Figure 4:
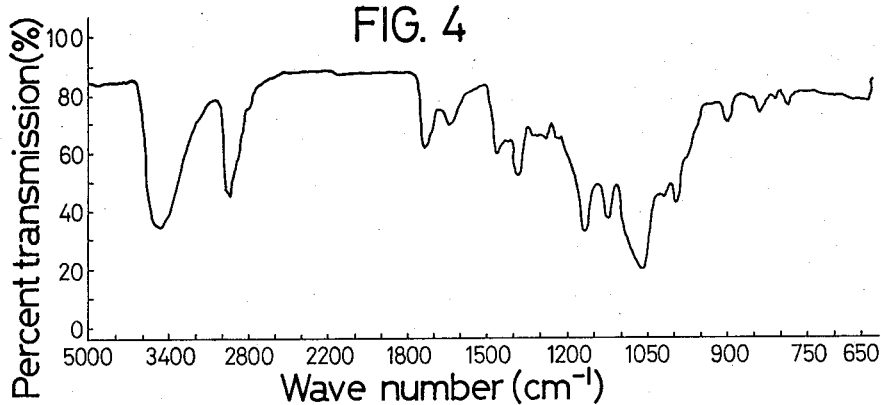
FIG. 4 shows an infrared absorption spectrum of spiramycin-N,N-diisopropylhydrazone by using the KBr tablet method.

Spiramycin (4 g.) was dissolved in ethyl alcohol (100 ml.) and the solution was added with an equimolar amount of N,N-diisopropylhydrazine. A reaction was carried out in a similar manner to that described in Example 2 to give a white powder. Infrared absorption spectrum of this producst by using the KBr tablet method is shown in FIG. 4. Yield: 4 g. M.P.: 121.6° C.

Example 9.—Synthesis of spiramycin-N,N-diallylhydrazone

Figure 5:
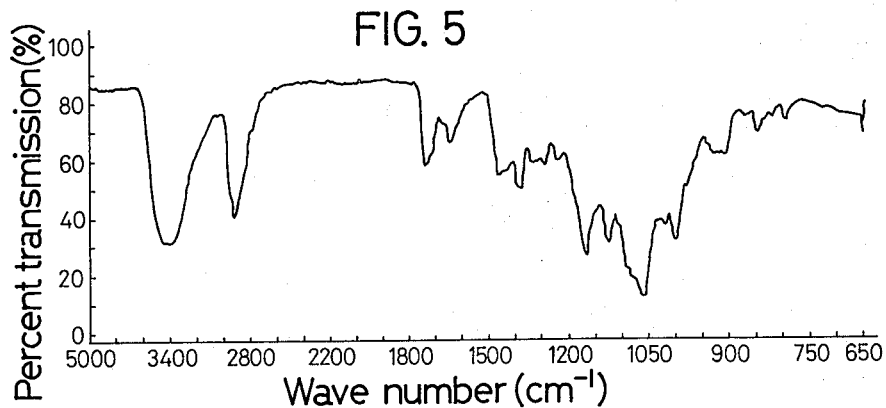
FIG. 5 shows an infrered absorption spectrum of spiramycin-N,N-diallylhydrazone by using the KBr tablet method.

Spiramycin (4 g.) was dissolved in ethyl alcohol (100 ml.). To the solution was added an equimolar amount of N,Ndiallylhydrazine. A reaction was carried out in a similar manner to that described in Example 2 to give a white powder. Infrared absorption spectrum of this product by using KBr tablet method is shown in FIG. 5. Yield: 4 g. M.P.: 85–98° C.

Example 10.—Synthesis of spiramycin-N-β-hydroxyethyl-N-methylhydrazone

Figure 6:
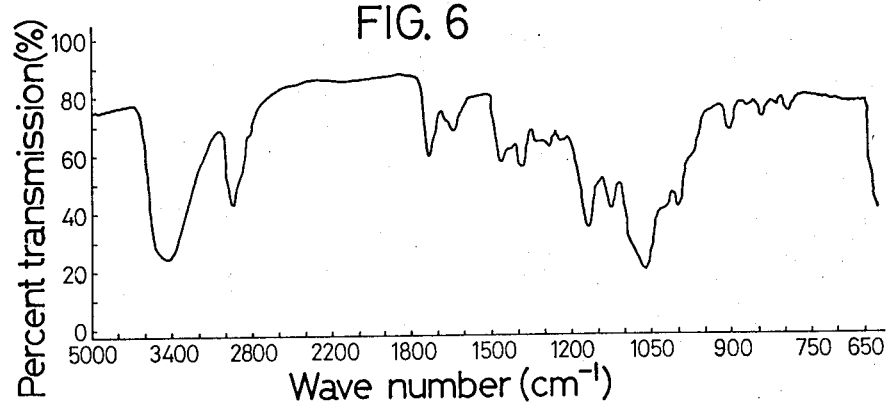
FIG. 6 shows an infrared absorption spectrum of spiramycin-N-β-hydroxyethyl-N-methylhydrazone by using the KBr tablet method.

Spiramycin (4 g.) was dissolved in ethyl alcohol (100 ml.). To the solution was added an equimolar amount of N-β-hydroxyethyl-N-methylhydrazine. A reaction was carried out in a similar manner to that described in Example 2 to give a white powder. Infrared absorption spectrum of this product by using KBr tablet method is shown in FIG. 6. Yield: 4 g. M.P.: 109–115° C.

Example 11.—Synthesis of acetylspiramycin dimethylhydrazone

Figure 7:
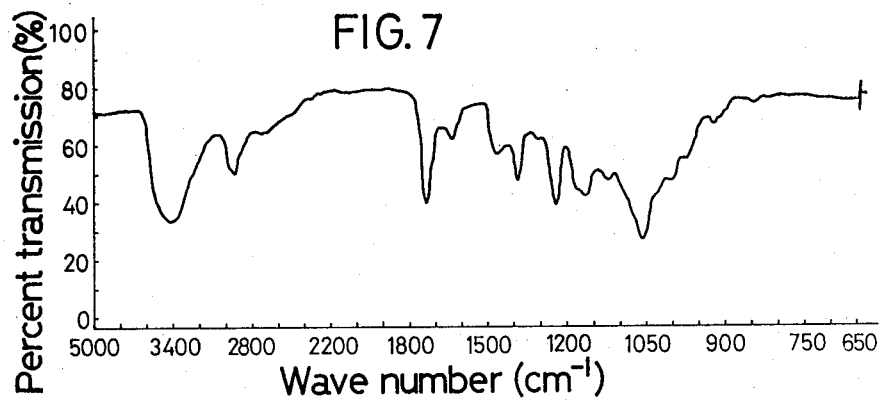
FIG. 7 shows an infrared absorption spectrum of acetylspiramycin dimethylhydrazone by using the KBr tablet method.
Figure 14:
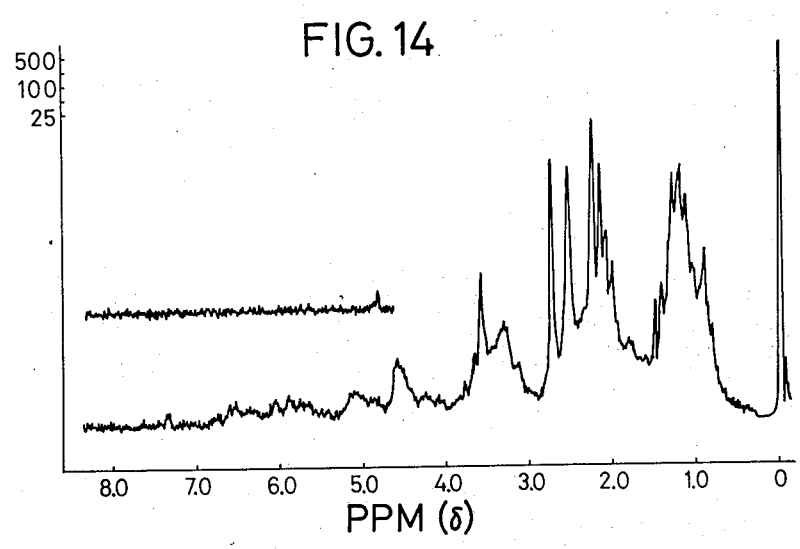
FIG. 14 shows a 60 mHz. nuclear magnetic resonance spectrum of acetylspiramycin dimethylhydrazone in $CDCl_3$.

By using spiramycin (4 g.), a reaction was carried out in a similar manner to that described in Example 2. Inrared absorption spectrum of the obtained white powder by using KBr tablet method is shown in FIG. 7. Nuclear magnetic resonance spectrum (60 mHz.) of this product in $CDCl_3$ is shown in FIG. 14. Yield: 4 g. M.P.: 114–118° C.

Example 12.—Synthesis of spiramycin 1-amino-4-methylpiperazinehydrazone

Figure 8:
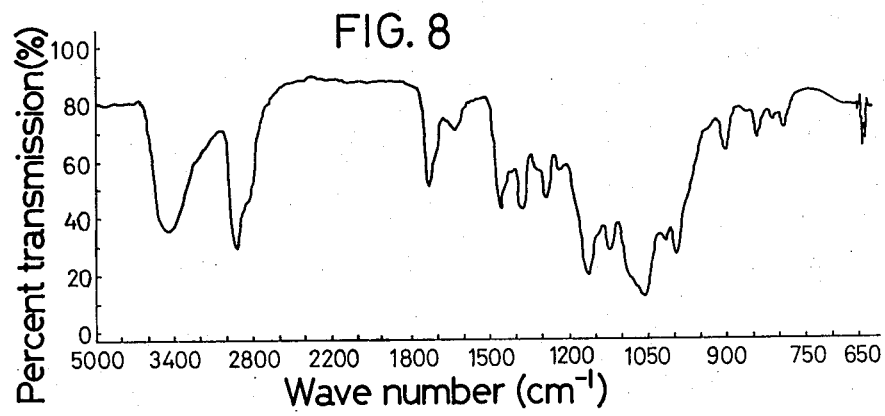
FIG. 8 shows an infrared absorption spectrum of spiramycin 1-amino-4-methylpiperazinehydrazone by using the KBr tablet method.
Figure 15:
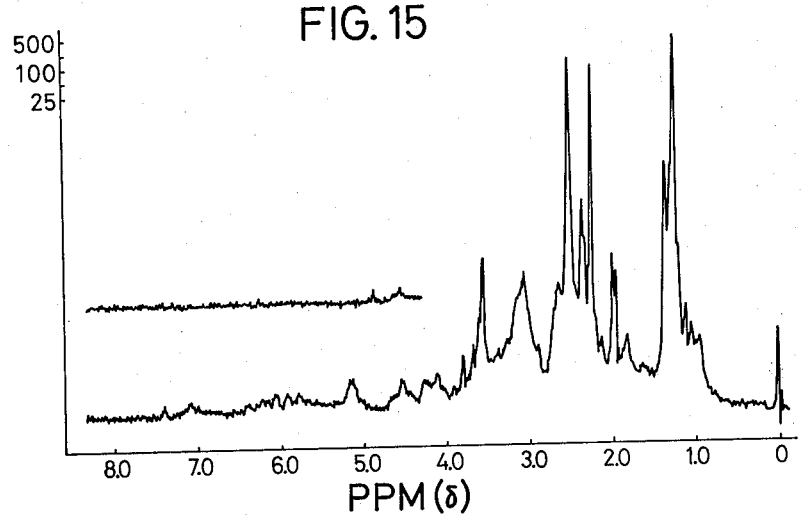
FIG. 15 shows a 60 mHz. nuclear magnetic resonance spectrum of spiramycin 1-amino-4-methylpiperazinehydrazone in $CDCl_3$.

Spiramycin (4 g.) was dissolved in ethyl alcohol (100 ml.). Twice as much 1-amino-4-methylpiperazine was then added to the solution. Reaction was carried out in a similar manner to that described in Example 2 to give a white powder, of which nuclear magnetic resonance spectrum and infrared absorption spectrum show that the product is spiramycin 1-amino - 4 - methylpiperazinehydrazone. Infrared absorption spectrum by using KBr tablet method and nuclear magnetic resonance spectrum (60 mHz.) in $CDCl_3$ of this product are shown in FIG. 8 and FIG. 15, respectively. Yield: 4 g. M.P.: 121–129° C.

Example 13.—Synthesis of spiramycin-N-phenyl-N-methylhydrazone

Figure 9:
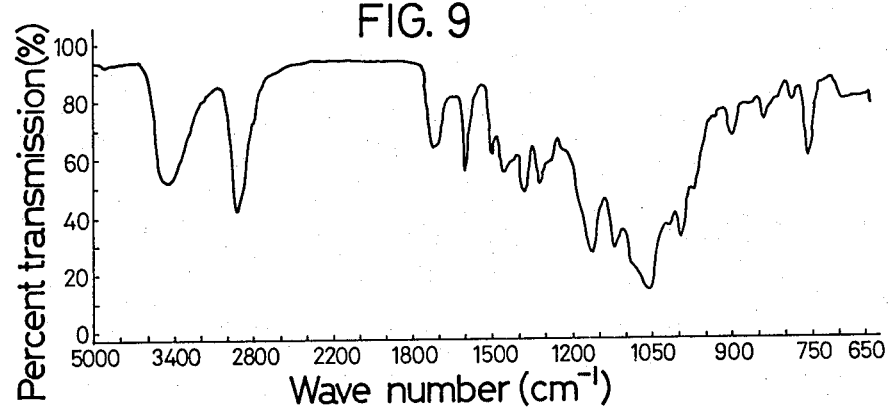
FIG. 9 shows an infrared absorption spectrum of spiramycin-N-phenyl-N-methylhydrazone by using the KBr tablet method.

Spiramycin (4 g.) was dissolved in ethyl alcohol (100 ml.) and the solution was added with an equimolar amount of N-phenyl-N-methylhydrazine. A reaction was carried out in a similar manner to that described in Example 2 to give a white powder. Infrared absorption spectrum of this product by using KBr tablet method is shown in FIG. 9. Yield: 4 g. M.P.: 87–93° C.

Example 14.—Synthesis of spiramycin-N-cyclohexyl-N-methylhydrazone

Figure 10:
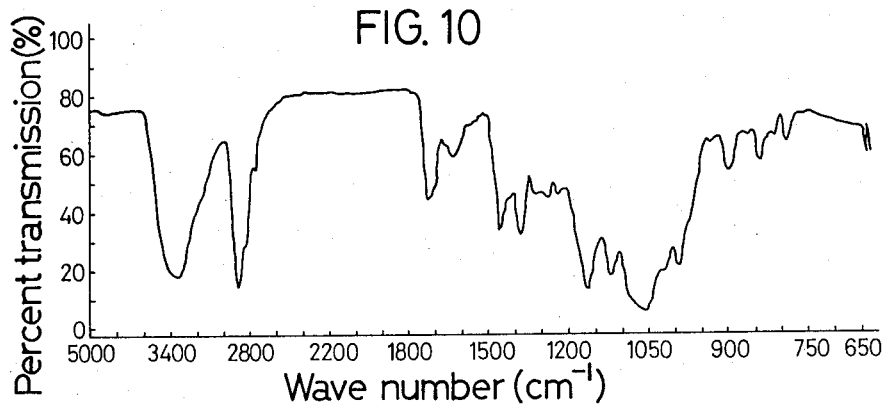
FIG. 10 shows an infrared absorption spectrum of spiramycin-N-cyclohexyl-N-methylhydrazone.

Spiramycin (4 g.) was dissolved in ethyl alcohol (100 ml.). To the solution was added an equimolar amount of N-cyclohexyl-N-methylhydrazine. By carrying out a reaction in a similar manner to that described in Example 2, a white powder was obtained. Infrared absorption spectrum of this product by using KBr tablet method is shown in FIG. 10. Yield: 4 g. M.P.: 87–100° C.

Example 15.—Synthesis of acetyl spiramycin-N-aminopiperidinehydrazone

Figure 11:
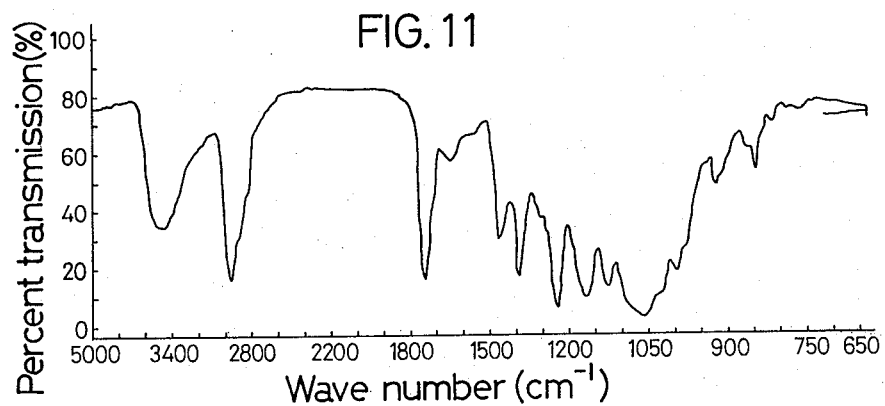
FIG. 11 shows an infrared absorption spectrum of acetyl-spiramycin-N-aminopiperidinehydrazone.

Acetyl spiramycin (4 g.) was dissolved in ethyl alcohol (100 ml.). To the solution was added an equimolar amount of N-aminopiperidine. A reaction was carried out in a similar manner to that described in Example 2 to give a white powder. Infrared absorption spectrum of this product by using KBr tablet method is shown in FIG. 11. Yield: 4 g. M.P.: 106–116° C.

Example 16.—Synthesis of spiramycin-N-aminomorpholine hydrazone

Figure 12:
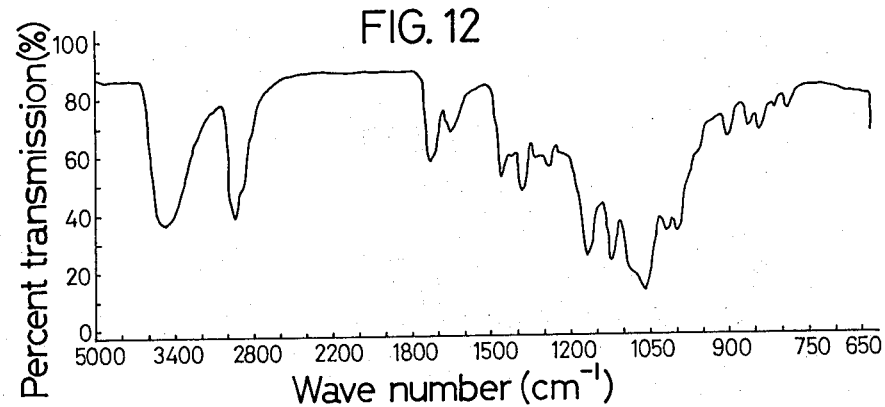
FIG. 12 shows an infrared absorption spectrum of spramycin-N-aminomorpholine hydrazone.

Spiramycin (4 g.) was dissolved in ethyl alcohol (100 ml.). To the solution was added an equimolar amount of N-aminomorpholine. A reaction was carried out in a similar manner to that described in Example 2 to give a white powder. Infrared absorption spectrum of this product by using KBr tablet method is shown in FIG. 12. Yield: 4 g. M.P.: 127–131° C.

Having described the invention, that which is sought to be protected is set forth in the following claims.

What is claimed is:

1. Spiramycin hydrazones selected from the group consisting of:
Spiramycin dimethylhydrazone
Spiramycin N,N-dinormalamylhydrazone
Spiramycin N,N-diisopropylhydrazone
Spiramycin N,N-diallylhydrazone
Spiramycin N-$\beta$-hydroxyethyl-N-methylhydrazone
Acetylspiramycin dimethylhydrazone
Spiramycin 1-amino-4-methylpiperazinehydrazone
Spiramycin N-phenyl-N-methylhydrazone
Spiramycin N-cyclohexyl-N-methylhydrazone
Acetyl spiramycin N-aminopiperidinehydrazone
Spiramycin N-aminomorpholine hydrazone acetyl esters and hydrochloride salts thereof.

References Cited

UNITED STATES PATENTS

| | | | |
|---|---|---|---|
| 3,000,786 | 9/1961 | Wettstein et al. | 260—210 AB |
| 3,129,259 | 4/1964 | Gardner et al. | 260—211 R |
| 3,133,912 | 5/1964 | Kimmig et al. | 260—211.5 R |
| 3,424,743 | 1/1969 | Uzu et al. | 260—210 R |

OTHER REFERENCES

Pigman: "The Carbohydrates," 1957, Academic Press Inc., New York, N.Y., pp. 452–453.

JOHNNIE R. BROWN, Primary Examiner

U.S. Cl. X.R.

424—180